(12) United States Patent
Lee et al.

(10) Patent No.: US 11,958,341 B2
(45) Date of Patent: Apr. 16, 2024

(54) VEHICULAR AIR-CONDITIONING APPARATUS HAVING PHOTOCATALYTIC MODULE

(71) Applicants: HYUNDAI MOTOR COMPANY, Seoul (KR); KIA MOTORS CORPORATION, Seoul (KR)

(72) Inventors: Jae Seung Lee, Hwaseong-si (KR); Gee Young Shin, Suwon-si (KR); Dae Hee Lee, Incheon (KR); Dong Ho Kwon, Yongin-si (KR); Seung Sik Han, Hwaseong-si (KR); Myung Hoe Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 791 days.

(21) Appl. No.: 17/081,624

(22) Filed: Oct. 27, 2020

(65) Prior Publication Data
US 2022/0009319 A1    Jan. 13, 2022

(30) Foreign Application Priority Data
Jul. 13, 2020    (KR) .................. 10-2020-0086023

(51) Int. Cl.
*B60H 3/06* (2006.01)
*B60H 1/00* (2006.01)

(52) U.S. Cl.
CPC ....... *B60H 3/0633* (2013.01); *B60H 1/00564* (2013.01); *B60H 3/0658* (2013.01); *B60H 2003/0675* (2013.01)

(58) Field of Classification Search
CPC .............. B60H 3/0633; B60H 3/0658; B60H 2003/0675; B60H 1/00564
See application file for complete search history.

(56) References Cited

U.S. PATENT DOCUMENTS

2008/0311011 A1 * 12/2008 Tsai .................... B01D 53/864
422/186.3

FOREIGN PATENT DOCUMENTS

EP          0826531 A2 *  3/1998
KR    10-2013-0024208 A    3/2013

* cited by examiner

*Primary Examiner* — Steven S Anderson, II
(74) *Attorney, Agent, or Firm* — Lempia Summerfield Katz LLC

(57) ABSTRACT

A vehicular air-conditioning apparatus includes a photocatalytic module in which light is radiated on a photocatalytic filter to sterilize the photocatalytic filter. In particular, vehicular air-conditioning apparatus incudes: a duct to allow conditioned air to flow therethrough; the photocatalytic filter mounted in the duct and coated with a photocatalytic material to remove harmful substances in reaction to light energy; and a rotation unit rotatably mounted in the duct. In particular, the rotation unit is provided with a light source to radiate light toward the photocatalytic filter. When the rotation unit is rotated, a position of the light source is changed in a rotational direction of the rotation unit such that the light is radiated on the photocatalytic filter over an increased range. Thus, a filter sterilization effect is improved over the entire area of the photocatalytic filter with reduced number of light sources.

9 Claims, 4 Drawing Sheets

VEHICULAR AIR-CONDITIONING APPARATUS HAVING PHOTOCATALYTIC MODULE

CROSS-REFERENCE TO THE RELATED APPLICATION

This application claims priority to and the benefit of Korean Patent Application No. 10-2020-0086023, filed on Jul. 13, 2020, the entire contents of which are incorporated herein by reference.

FIELD

The present disclosure relates to a vehicular air-conditioning apparatus that sterilizes a filter for removing foreign substances contained in conditioned air.

BACKGROUND

The statements in this section merely provide background information related to the present disclosure and may not constitute prior art.

Vehicles are equipped with an air-conditioning apparatus for providing conditioned air to the interior thereof. In such an air-conditioning apparatus, a duct, through which conditioned air circulates, is provided therein with a filter for removing foreign substances contained in the conditioned air, the temperature of which has been adjusted, in order to provide clean air.

Conditioned air continuously passes through the filter. When humid conditioned air passes through the filter, moisture is formed in the filter. In this case, we have discovered that various microorganisms and bacteria propagate in the moisture, and cause a bad smell. In this manner, if the filter is contaminated, conditioned air containing fungi or bacteria is supplied to the interior, thus harming occupants' health and being unpleasant to occupants due to the bad smell thereof.

We have found that even if a filter capable of suppressing the growth of bacteria is used, the filter is eventually contaminated due to continuous circulation of conditioned air.

The information disclosed in this Background of the Present disclosure section is only for enhancement of understanding of the general background of the present disclosure and should not be taken as an acknowledgement or any form of suggestion that this information forms the related art already known to a person skilled in the art.

SUMMARY

The present disclosure provides a vehicular air-conditioning apparatus having a photocatalytic module in order to remove bacteria from a filter for removing foreign substances contained in conditioned air, thereby supplying clean air to the interior.

In one form of the present disclosure, a vehicular air-conditioning apparatus having a photocatalytic module includes: a duct configured to allow conditioned air to flow therethrough, a photocatalytic filter mounted in the duct and coated with a photocatalytic material removing harmful substances in reaction to light energy, and a rotation unit rotatably mounted in the duct in the state of being spaced apart from the photocatalytic filter and provided with at least one light source radiating light toward the photocatalytic filter. When the rotation unit is rotated, the position of the light source is changed in a rotational direction of the rotation unit such that light is radiated on the photocatalytic filter over an increased range.

The rotation unit may be rotated by the conditioned air flowing through the duct.

The photocatalytic filter and the rotation unit may be sequentially arranged in the duct in the direction in which the conditioned air flows.

The rotation unit may include a fixed body extending across the interior of the duct and fixed to the interior of the duct and a rotary body rotatably mounted to the fixed body and disposed at the center of the interior of the duct. The rotary body may include at least one wing so as to be rotated by the conditioned air, and the light source may be mounted on the wing.

The at least one wing may include a plurality of wings arranged about the rotational center point of the rotary body, and the at least one light source may include a plurality of light sources. Each of the plurality of light sources may be mounted on a respective one of the plurality of wings.

In one form, the at least one light source may include a plurality of light sources disposed at the rotational center point of the rotary body and the distal end portion of the wing.

The fixed body may include a mounting portion and a hinge pin formed at the mounting portion, and the rotary body may include a connection portion rotatably connected to the mounting portion via the hinge pin. The wing may extend from the connection portion.

The mounting portion may be provided with a power terminal configured to supply electrical energy, and the connection portion may be provided with a connection terminal electrically connected to the power terminal.

Any one or both of the power terminal and the connection terminal may extend in the rotational direction of the rotary body so as to have a ring shape.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
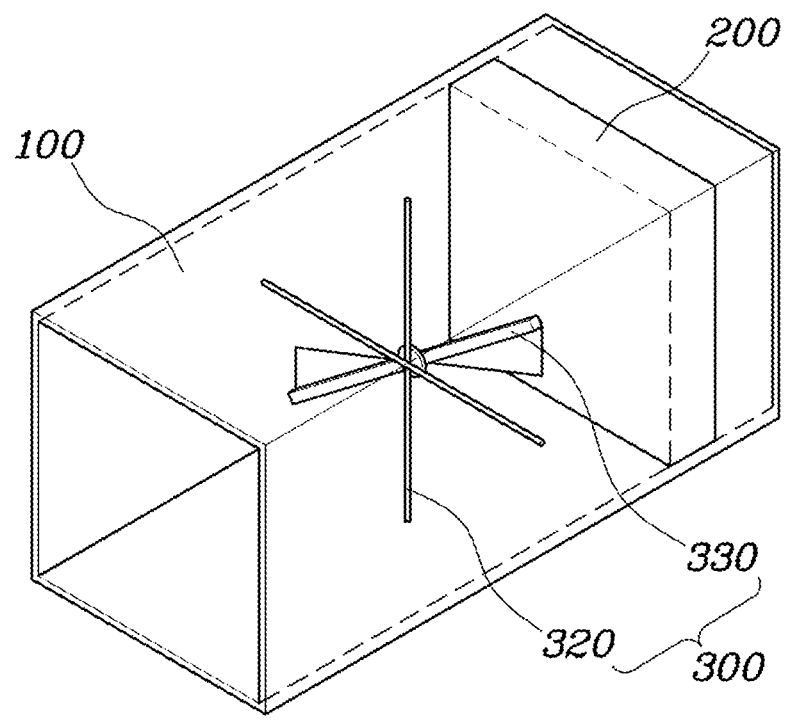
FIG. 1 is a view showing a vehicular air-conditioning apparatus having a photocatalytic module in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a vehicular air-conditioning apparatus having a photocatalytic module according to exemplary forms of the present disclosure will be described with reference to the accompanying drawings.

Figure 2:
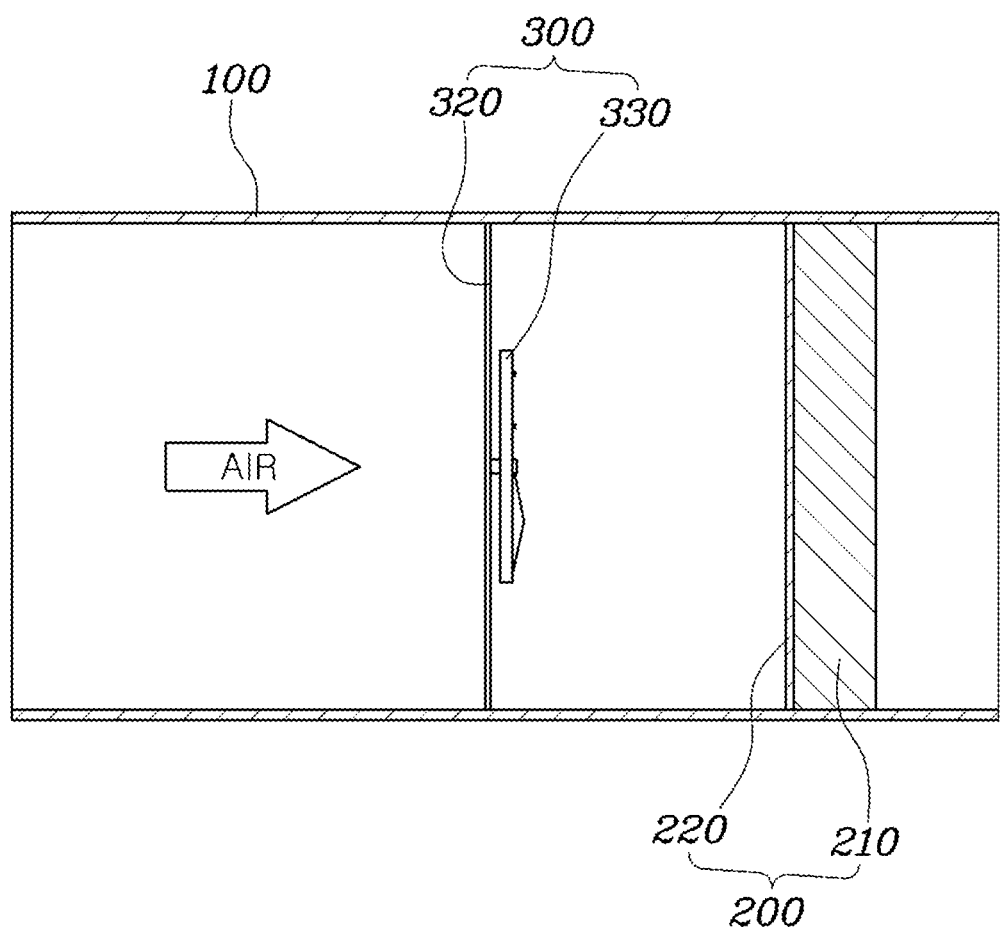
FIG. 2 is a cross-sectional view of the vehicular air-conditioning apparatus having a photocatalytic module shown in FIG. 1.
Figure 3:
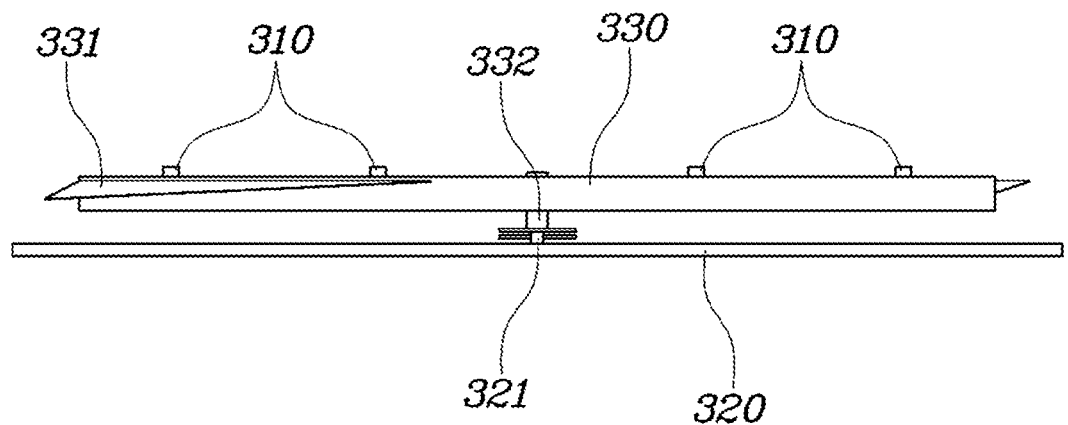
FIG. 3 is a view for explaining a rotation unit of the vehicular air-conditioning apparatus having a photocatalytic module shown in FIG. 1.
Figure 4:
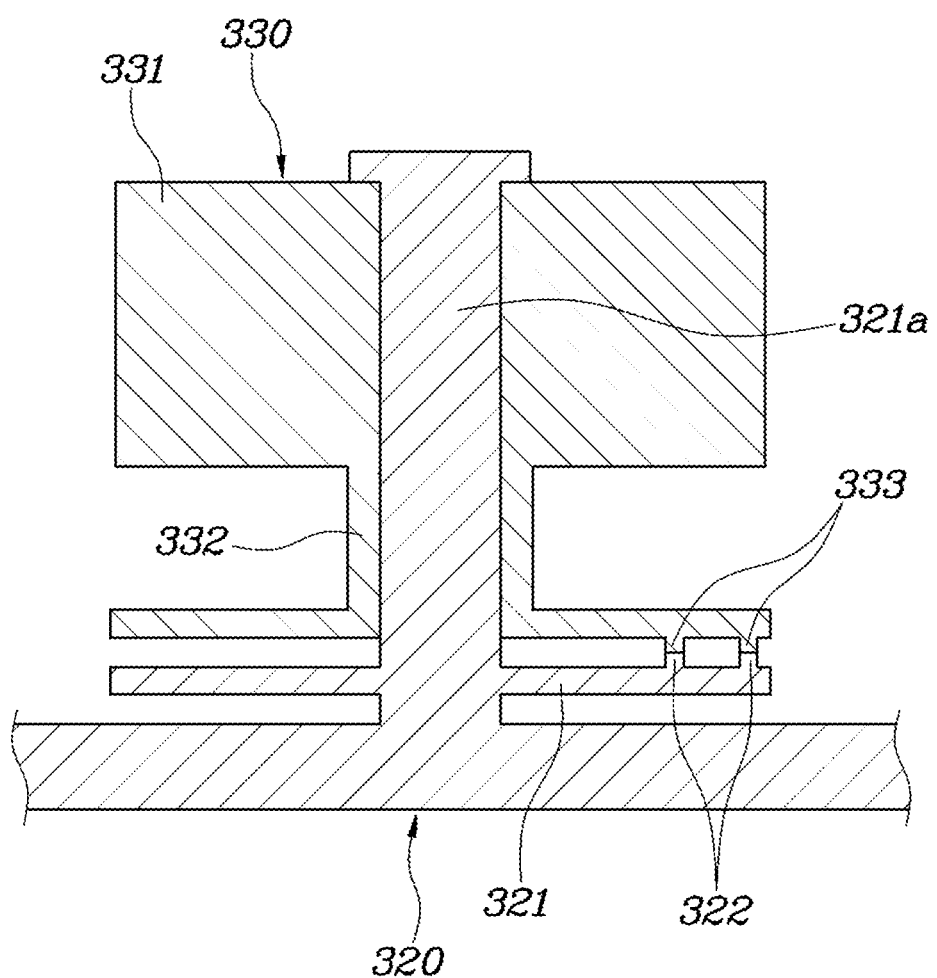
FIG. 4 is a cross-sectional view showing the connection between a fixed body and a rotary body of the vehicular air-conditioning apparatus having a photocatalytic module shown in FIG. 1.
Figure 5:
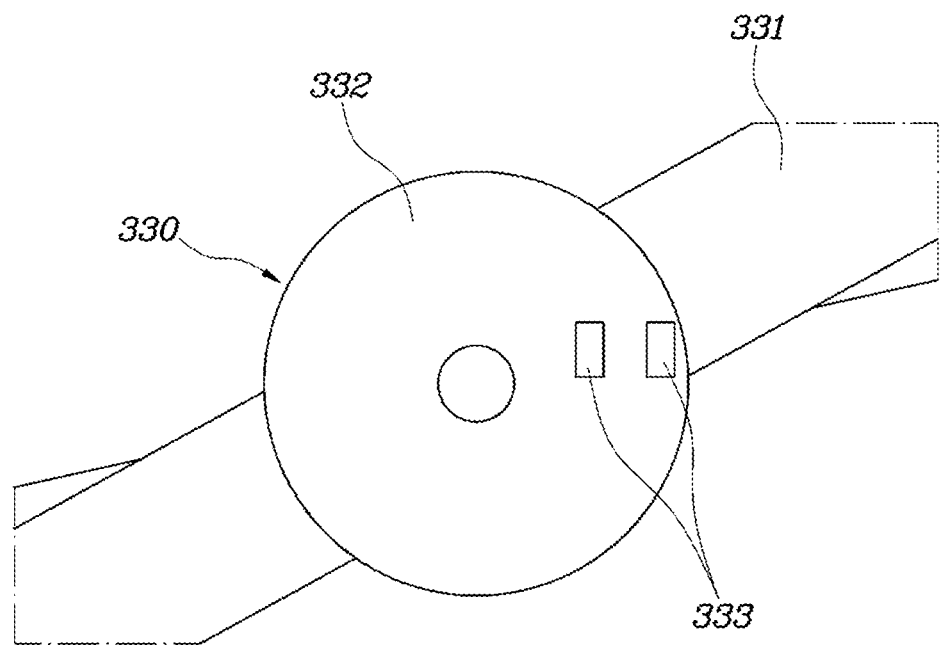
FIGS. 5 and 6 are views for respectively explaining a connection portion and a connection terminal of the vehicular air-conditioning apparatus having a photocatalytic module shown in FIG. 1.
Figure 6:
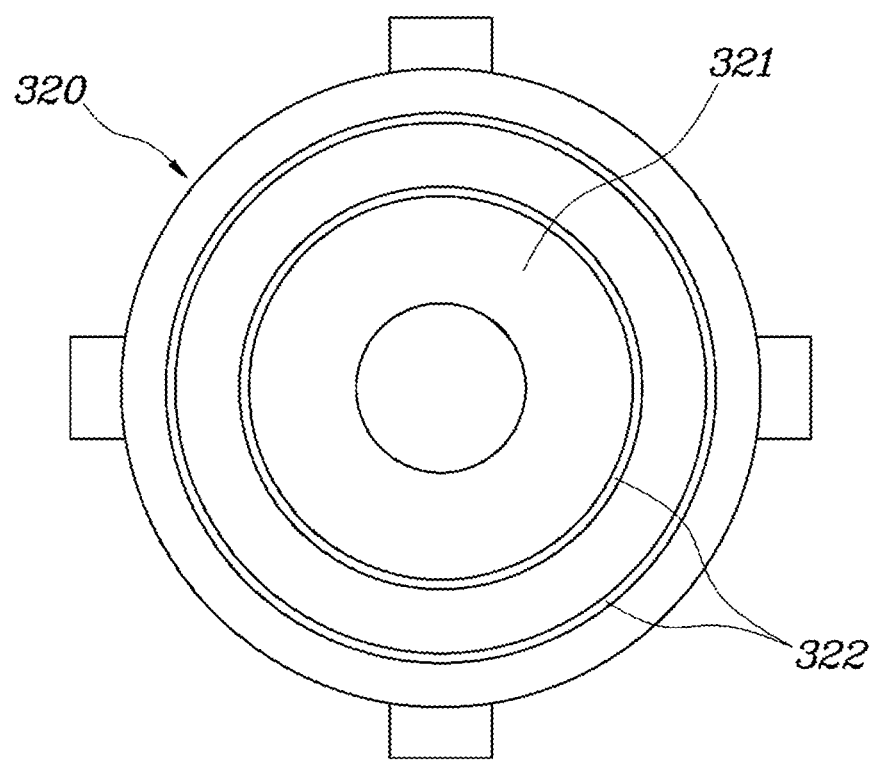

FIG. 1 is a view showing a vehicular air-conditioning apparatus having a photocatalytic module in one form of the present disclosure, FIG. 2 is a cross-sectional view of the vehicular air-conditioning apparatus having a photocatalytic module shown in FIG. 1, FIG. 3 is a view for explaining a rotation unit of the vehicular air-conditioning apparatus having a photocatalytic module shown in FIG. 1, FIG. 4 is a cross-sectional view showing the connection between a fixed body and a rotary body of the vehicular air-conditioning apparatus having a photocatalytic module shown in FIG. 1, and FIGS. 5 and 6 are views for explaining a connection portion and a connection terminal of the vehicular air-conditioning apparatus having a photocatalytic module shown in FIG. 1.

As shown in FIGS. 1 and 2, the vehicular air-conditioning apparatus having a photocatalytic module may include: a duct 100, through which conditioned air flows, a photocatalytic filter 200, which is mounted in the duct 100 and is coated with a photocatalytic material for removing harmful substances in reaction to light energy, and a rotation unit 300, which is disposed in the duct 100 in the state of being spaced apart from the photocatalytic filter 200 and is mounted so as to be rotated by the conditioned air flowing through the duct 100. The rotation unit 300 includes a light source 310 for radiating light toward the photocatalytic filter 200. When the rotation unit 300 is rotated by the conditioned air, the position of the light source 310 is changed in the rotational direction of the rotation unit 300, and the light is radiated on the photocatalytic filter 200 over a broader range.

That is, the photocatalytic filter 200 and the rotation unit 300 are provided in the duct 100, through which conditioned air flows. Here, the photocatalytic filter 200 is fixed in the duct 100 such that the outer peripheral surface thereof is in contact with the inner peripheral surface of the duct 100, and thus the conditioned air flowing through the duct 100 passes through the photocatalytic filter 200. The photocatalytic filter 200 includes a filter 210 composed of a plurality of fine cells to allow conditioned air to pass therethrough and a photocatalytic material 220 coated on one surface of the filter. Here, the photocatalytic material 220 may include TiO2 so as to remove bacteria without being changed by the light radiated thereon.

The rotation unit 300 is disposed in the duct 100 so as to be spaced apart from the photocatalytic filter 200, and provides light to the photocatalytic filter 200. The light source 310 of the rotation unit 300 is spaced apart from the photocatalytic filter 200, and radiates light toward the photocatalytic filter 200. Here, the light source 310 may be configured as a light-emitting diode (LED) for radiating light. In particular, the rotation unit 300 is mounted so as to be rotated by the conditioned air flowing through the duct 100. When the rotation unit 300 is rotated by the conditioned air, the position of the light source 310 is changed in a rotational direction of the rotation unit 300, and the light is radiated on the photocatalytic filter 200 over a broader range.

Because the photocatalytic filter 200 has a planar area large enough to fill the interior of the duct 100, there is a limitation in that it is not possible to radiate light on the entire area of the photocatalytic filter 200 using only one light source 310. Therefore, the position of the light source 310 is changed when the rotation unit 300 is rotated by the conditioned air, with the result that the light radiated on the photocatalytic filter 200 is diffused, and thus the entire area of the photocatalytic filter 200 is capable of being sterilized by light. In addition, since the rotation unit 300 is rotated by the conditioned air, no separate power source for rotating the rotation unit 300 is required, and the flow of conditioned air is not disturbed.

As described above, the photocatalytic filter 200 is sterilized by light radiated thereon from the light source 310 provided at the rotation unit 300. In addition, since the position of the light source 310 is changed by rotation of the rotation unit 300, the area of the photocatalytic filter 200 onto which light is radiated increases, thus making it possible to sterilize the photocatalytic filter 200 using the minimum number of light sources 310. In addition, the structure is simplified because conditioned air is used as power for rotating the rotation unit 300.

In one form, as shown in FIG. 2, the photocatalytic filter 200 and the rotation unit 300 may be sequentially arranged in the duct 100 in the direction in which conditioned air flows. The rotation unit 300 is disposed in front of the photocatalytic filter 200 in the direction in which the conditioned air flows and thus rotated by the conditioned air. If the rotation unit 300 is located behind the photocatalytic filter 200, the rotation unit 300 may not rotate properly because the flow rate of the conditioned air is reduced after passing through the photocatalytic filter 200. Since the rotation unit 300 is disposed in front of the photocatalytic filter 200 in the direction in which the conditioned air flows, the rotation unit 300 is smoothly rotated by the conditioned air.

A detailed description of the rotation unit 300 will now be made. The rotation unit 300 includes a fixed body 320, which extends across the interior of the duct 100 and is fixed to the interior of the duct 100, and a rotary body 330, which is rotatably mounted to the fixed body 320 and is disposed at the center of the interior of the duct 100. The rotary body 330 includes a wing 331 so as to be rotated by the conditioned air, and the light source 310 is mounted on the wing 331.

Since the fixed body 320 extends across the interior of the duct 100, the fixed body 320 is fixed to the duct 100 at two fixed points, thereby minimizing shaking of the rotary body 330 mounted thereto. As illustrated in FIG. 1, the fixed body 320 may be provided in a plural number such that the fixed bodies 320 intersect each other and thus are more firmly fixed to the duct 100.

The rotary body 330 is rotatably mounted to the fixed body 320, and is disposed at the center of the interior of the duct 100 so as to be easily influenced by the conditioned air. In particular, the rotary body 330 is provided with the wing 331 so as to be easily influenced by the flow of conditioned air, whereby the rotary body 330 is capable of being smoothly rotated by the conditioned air. The wing 331 is formed to have a curved surface so as to generate rotational force using the flow of conditioned air. In addition, the light source 310 is mounted on the wing 331, and the position of the light source 310 is changed in a rotational direction of the rotation unit 300 when the rotary body 330 is rotated.

Accordingly, the rotation unit 300 is operated such that the wing 331 of the rotary body 330 generates rotational force using the flow of conditioned air, whereby the rotary body 330 is rotated relative to the fixed body 320 fixed to the duct 100. When the rotary body 330 is rotated, the light source 310 mounted on the wing 331 is moved in the rotational direction, thereby increasing the range over which the light source 310 radiates light.

As shown in FIG. 3, the wing 331 may be provided in a plural number such that the wings 331 are arranged about the rotational center point of the rotary body 330, and the light source 310 may be provided in a plural number such that each of the light sources 310 is mounted on a respective one of the wings 331. As the number of wings 331, which are influenced by the flow of conditioned air, increases, the rotary body 330 may be more reliably rotated. Although the wing 331 of the rotary body 330 is illustrated in the drawing as being provided in a pair such that the pair of wings 331 extends in a straight line over the rotational center point of the rotary body 330, the number of wings 331 may be determined depending on the required amount of rotation of the rotary body 330, which is rotated by the flow of conditioned air. In addition, since each of the light sources 310 is mounted on a respective one of the wings 331, it is possible to sufficiently secure the quantity of light radiated on the photocatalytic filter 200 and to maintain uniform radiation of light to the photocatalytic filter 200.

The light source 310 may be provided in a plural number such that the plurality of light sources 310 is disposed at the rotational center point of the rotary body 330 and the distal end portions of the wings 331. When the rotary body 330 is rotated, the light emitted from the light sources 310 mounted on the distal end portions of the wings 331 is radiated in the rotational direction of the wings 331. If the light sources 310 are disposed so as to be spaced apart from the rotational center point of the rotary body 330, an insufficient quantity of light may be radiated on the region of the photocatalytic filter 200 that corresponds to the rotational center point of the rotary body 330. For this reason, the light source 310 is also mounted on the rotational center point of the rotary body 330 so as to be capable of radiating a sufficient quantity of light to the corresponding region of the photocatalytic filter 200. Accordingly, the light emitted from the light sources 310 is radiated on substantially the entire area of the photocatalytic filter 200, thereby assuredly sterilizing the photocatalytic filter 200 using the light.

As shown in FIG. 4, the fixed body 320 may include a mounting portion 321 and a hinge pin 321a formed at the mounting portion 321, and the rotary body 330 may include a connection portion 332, which is rotatably connected to the mounting portion 321 via the hinge pin 321a. The wings 331 may extend from the connection portion 332. That is, the rotary body 330 is provided at the center thereof with the connection portion 332, which is hinged to the hinge pin 321a so as to be rotated in the state of being supported by the fixed body 320, whereby the wings 331 extending from the connection portion 332 are capable of being rotated by the conditioned air. The distal end of the hinge pin 321a may be formed in an expanded shape so as to prevent the connection portion 332 of the rotary body 330 from being separated from the hinge pin 321a, and the connection portion 332 may be mounted on the hinge pin 321a via a bearing.

Meanwhile, electrical energy needs to be supplied to the light source 310 for emitting light, which is mounted on the wing 331 of the rotary body 330. To this end, the rotary body 330 may be provided with an electric line, which is embedded therein so as to extend through the connection portion 332 and the wing 331 and to be connected to the light source 310, and with a printed circuit board (PCB). The rotary body 330 may be electrically connected to the fixed body 320, and may receive electric power desired for operation of the light source 310.

In another form, the mounting portion 321 may be provided with a power terminal 322 for supplying electrical energy, and the connection portion 332 may be provided with a connection terminal 333, which is electrically connected to the power terminal 322. The power terminal 322 provided at the mounting portion 321 of the fixed body 320 is connected to an electric line through which external electric power is supplied, and the connection terminal 333 provided at the connection portion 332 is electrically connected to the power terminal 322 and to the light source 310. Accordingly, when a command for turning on the light source 310 is input and external electric power is supplied in response thereto, the electric power is transmitted to the connection terminal 333 of the connection portion 332 via the power terminal 322 of the mounting portion 321, and is supplied to the light source 310 via the connection terminal 333, with the result that the light source 310 is turned on.

Since the rotary body 330 is rotated by the conditioned air, the connection portion 332 of the rotary body 330 is rotated relative to the mounting portion 321 of the fixed body 320. In order to maintain the connection between the power terminal 322 and the connection terminal 333 when the connection portion 332 of the rotary body 330 is rotated relative to the mounting portion 321, any one or both of the power terminal 322 and the connection terminal 333 may extend in the rotational direction of the rotary body 330 so as to have a ring shape.

In one example, as shown in FIGS. 5 and 6, the connection terminal 333 provided at the connection portion 332 of the rotary body 330 has a positive (+) pole and a negative (−) pole, and the power terminal 322 provided at the mounting portion 321 of the fixed body 320 also has a positive (+) pole and a negative (−) pole, which match the positive (+) pole and the negative (−) pole of the connection terminal 333. In this form, the power terminal 322 is formed in the shape of a ring that extends in the rotational direction of the rotary body 330. As a result, even when the rotary body 330 is rotated, the connection between the connection terminal 333 and the power terminal 322 is maintained, thereby enabling continuous supply of electric power.

In the vehicular air-conditioning apparatus having a photocatalytic module configured as described above, the photocatalytic filter 200 is sterilized by light radiated thereon. In addition, since the position of the light source 310 is changed by rotation of the rotation unit 300, light is radiated on the photocatalytic filter 200 over a broader range, thus making it possible to sterilize the photocatalytic filter 200 using the minimum number of light sources 310. In addition, the structure is simplified because conditioned air is used as power for rotating the rotation unit 300. In addition, it is possible to obtain an improved filter sterilization effect by enabling radiation of light onto the entire area of the photocatalytic filter 200 using the minimum number of light sources 310.

As is apparent from the above description, according to a vehicular air-conditioning apparatus having a photocatalytic module according to the present disclosure, light is radiated on the photocatalytic filter to sterilize the same. In addition, a filter sterilization effect is improved by enabling radiation of light onto the entire area of the photocatalytic filter using the minimum number of light sources.

Although exemplary forms of the present disclosure have been disclosed for illustrative purposes, those skilled in the art will appreciate that various modifications, additions and substitutions are possible, without departing from the scope and spirit of the present disclosure.

What is claimed is:

1. A vehicular air-conditioning apparatus having a photocatalytic module, comprising:
    a duct configured to allow conditioned air to flow therethrough;
    a photocatalytic filter mounted in the duct, wherein the photocatalytic filter is coated with a photocatalytic material configured to remove harmful substances in reaction to light energy; and
    a rotation unit rotatably mounted in the duct in a state of being spaced apart from the photocatalytic filter, the rotation unit being provided with at least one light source configured to radiate light toward the photocatalytic filter,
    wherein, when the rotation unit is rotated, a position of the at least one light source is changed in a rotational direction of the rotation unit such that the light is radiated on the photocatalytic filter over an increased range, and
    wherein the rotation unit is rotated by the conditioned air flowing through the duct.

2. The vehicular air-conditioning apparatus of claim 1, wherein the photocatalytic filter and the rotation unit are sequentially arranged in the duct in a direction in which the conditioned air flows.

3. The vehicular air-conditioning apparatus of claim 1, wherein the rotation unit comprises:
    a fixed body extending across an interior of the duct and fixed to the interior of the duct; and
    a rotary body rotatably mounted to the fixed body and disposed at a center of the interior of the duct, the rotary body comprising at least one wing configured to be rotated by the conditioned air, and
    wherein the at least one light source is mounted on the at least one wing.

4. The vehicular air-conditioning apparatus of claim 3, wherein:
    the at least one wing comprises a plurality of wings arranged about a rotational center point of the rotary body,
    the at least one light source comprises a plurality of light sources, and
    each light source of the plurality of light sources is mounted on a respective one of the plurality of wings.

5. The vehicular air-conditioning apparatus of claim 3, wherein the at least one light source comprises a plurality of light sources disposed at a rotational center point of the rotary body and a distal end portion of the wing.

6. The vehicular air-conditioning apparatus of claim 3, wherein:
    the fixed body comprises a mounting portion and a hinge pin formed at the mounting portion,
    the rotary body comprises a connection portion rotatably connected to the mounting portion via the hinge pin, and
    the at least one wing extends from the connection portion.

7. The vehicular air-conditioning apparatus of claim 6, wherein:
    the mounting portion is provided with a power terminal configured to supply electrical energy, and
    the connection portion is provided with a connection terminal electrically connected to the power terminal.

8. The vehicular air-conditioning apparatus of claim 7, wherein at least one of the power terminal or the connection terminal extend in a rotational direction of the rotary body so as to have a ring shape.

9. A vehicular air-conditioning apparatus having a photocatalytic module, comprising:
    a duct configured to allow conditioned air to flow therethrough;
    a photocatalytic filter mounted in the duct, wherein the photocatalytic filter is coated with a photocatalytic material configured to remove harmful substances in reaction to light energy; and
    a rotation unit rotatably mounted in the duct in a state of being spaced apart from the photocatalytic filter, the rotation unit being provided with at least one light source configured to radiate light toward the photocatalytic filter,
    wherein, when the rotation unit is rotated, a position of the at least one light source is changed in a rotational direction of the rotation unit such that the light is radiated on the photocatalytic filter over an increased range,
    wherein the rotation unit comprises:
        a fixed body extending across an interior of the duct and fixed to the interior of the duct; and
        a rotary body rotatably mounted to the fixed body and disposed at a center of the interior of the duct, the rotary body comprising at least one wing configured to be rotated by the conditioned air, and
    wherein the at least one light source is mounted on the at least one wing.

* * * * *